(No Model.)
A. W. GRANT & D. P. JEFFERIES.
RUBBER WHEEL TIRE.
No. 470,483. Patented Mar. 8, 1892.
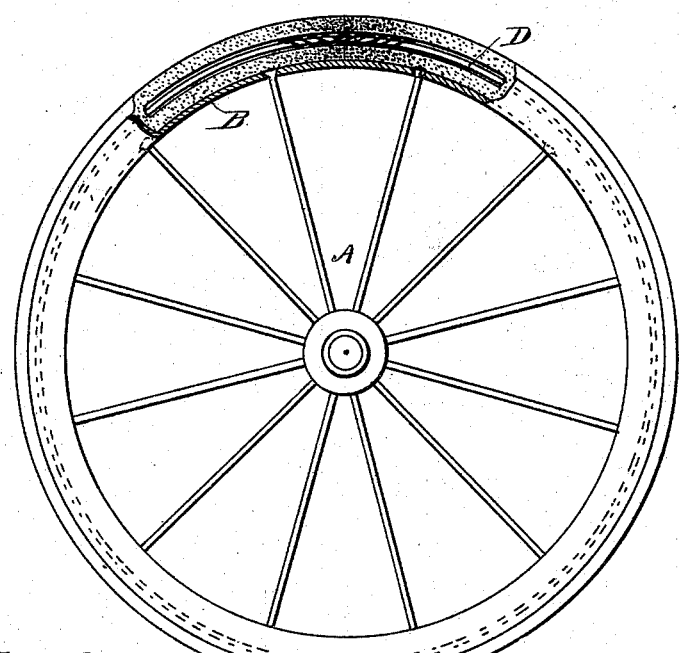
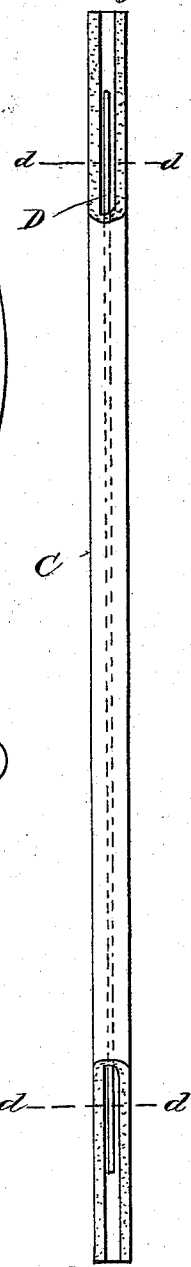
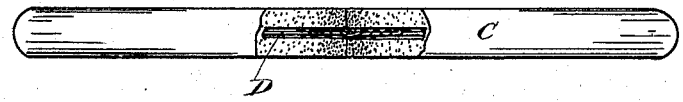
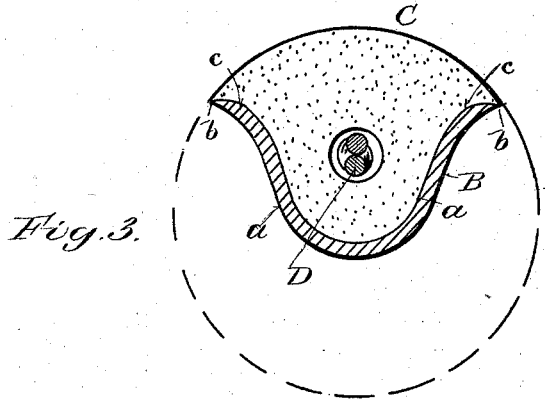
WITNESSES
H. M. Plaisted.
Warren Hill
INVENTORS,
Daniel P. Jefferies and
Arthur W. Grant,
By H. A. Toulmin
their Attorney.

UNITED STATES PATENT OFFICE.

ARTHUR W. GRANT AND DANIEL P. JEFFERIES, OF SPRINGFIELD, OHIO.

RUBBER WHEEL-TIRE.

SPECIFICATION forming part of Letters Patent No. 470,483, dated March 8, 1892.

Application filed November 14, 1890. Serial No. 371,461. (No model.)

*To all whom it may concern:*

Be it known that we, ARTHUR W. GRANT and DANIEL P. JEFFERIES, citizens of the United States, residing at Springfield, in the county of Clark and State of Ohio, have invented certain new and useful Improvements in Cores for Rubber Wheel-Tires, of which the following is a specification, reference being had therein to the accompanying drawings.

This invention relates to new and useful improvements in vehicle-wheel tires and rims, the peculiarities of which will be hereinafter pointed out, and particularly specified in the claim.

In the accompanying drawings, forming a part of this specification, and on which like reference-letters indicate corresponding parts, Figure 1 represents a partial side elevation and sectional view of a wheel embodying our invention; Fig. 2, an edge view of the same with a portion of the tire broken away; Fig. 3, an enlarged cross-section of the tire, the rim, and the core; and Fig. 4, a detail sectional view of the tire and core.

The letter A designates a metallic wheel of any of the kinds commonly known and provided with a metallic rim. The cross section of this rim is somewhat peculiar and is shown in Fig. 3. The object of this shape will be understood in connection with the explanation of the cross-section of the tire. The tire is designated by the letter C and is constructed of india-rubber in the manner well known. In cross-section, however, the tire instead of being circular occupies but a segment of a circle. Looking at Fig. 3, it will be seen that about fifty per cent. of the circle is eliminated and the rim made concave between the points $a$ and $a$ and convex between the points $a$ $b$. By convexing this portion it is made to form a convenient shape, and by concaving the parts indicated it is varied in cross-section on lines drawn across the tire between the points $a$ and $b$, and it is also by this concave form made to extend out over the rim, while the rim itself is given additional strength by such form of cross-section. The rim is chamfered or beveled off between the points $b$ and $c$, so as to reduce the thickness of its outer edge and admit of being completely covered by the outer portion of the tire. At the same time the arc of the tread is increased in length somewhat, because it terminates at the inner wall or surface of the rim. This beveling of the rim also facilitates the introduction of the tire into it. It will be seen, also, that while the peculiar contours described have the advantages named the segmental form of the tire, combined with such contour, reduces the cross-section of the tire to but a comparatively small part of the area of a circle having the same radius as the tread of the tire. The life and durability of the tire are equal to those of a tire occupying a full circle in cross-section, while the expense of production and cost of material are greatly lessened.

Referring to another branch of our invention, it will be seen from Fig. 4 that the tire is longer than the core D. The core is to be the proper length for extending around the rim and having its ends twisted together or otherwise connected. The tire, however, is of greater length than the circumference of the rim will require. In order, therefore, to connect the ends of the core, the tire must be compressed lengthwise, so as to shorten it to, say, the points indicated by dotted lines $d$ in Fig. 4. This done, the ends of the core are sufficiently exposed to effect a connection between them. Having effected such connection, the tire is released and by its expansibility its ends are brought into forcible contact. Referring to Figs. 1 and 2, it will be seen that the dots appearing in the tire are closest or thickest at and adjacent to the meeting ends of the tire. These indicate the compressed condition of the tire, which principally shows itself in and about its meeting ends. Thus it will be seen that the expansibility of the tire is constantly acting to prevent its ends from separating and its consequent elongation, whereby it might become dislodged from the rim. Thus by connecting a tire of greater length than is necessary to merely encompass the rim its expansibility may be utilized as the means of preventing its dislodgment. Thus the ends are made to abut each other strongly and are held in intimate contact. This operation, in connection with a suitable core, maintains the tire properly upon the rim.

While we have shown and described the tire as of greater normal length than the circumference of the rim, we do not lay any claim to such feature, understanding it to be old, but refer to it merely as one convenient way of maintaining the tire in the rim. Our claim for the peculiar features of invention comprised herein is without reference to this relative length of the tire to the periphery of the rim.

Having thus fully described our invention, what we claim as new, and desire to secure by Letters Patent, is—

The combination, with a wheel-rim having its edges flared outwardly, flared portions being curved and beveled along the edges on the inside thereof, concaved from $a$ to $a$ and convexed from $a$ to $b$, and a rubber tire whose inner part is concaved next to the edges inward to fit said rim and convexed in the middle part to fit said rim, the edges of the tire being reduced in thickness and the area of the tire and rim in cross-section being less than half a circle.

In testimony whereof we affix our signatures in presence of two witnesses.

ARTHUR W. GRANT.
DANIEL P. JEFFERIES.

Witnesses:
M. I. BURNHAM,
WARREN HULL.